(12) United States Patent
Gee

(10) Patent No.: US 8,132,389 B2
(45) Date of Patent: Mar. 13, 2012

(54) DEVICE AND METHOD FOR SECURING A BOLT IN CONCRETE

(76) Inventor: Anthony F. Gee, Tallahassee, FL (US)

(*) Notice: Subject to any disclaimer, the term of this patent is extended or adjusted under 35 U.S.C. 154(b) by 199 days.

(21) Appl. No.: 12/657,516

(22) Filed: Jan. 22, 2010

(65) Prior Publication Data

US 2011/0179748 A1 Jul. 28, 2011

(51) Int. Cl.
*E04B 1/38* (2006.01)
*E04B 1/00* (2006.01)
*E04C 5/00* (2006.01)
*E04G 21/00* (2006.01)
*E04G 23/00* (2006.01)

(52) U.S. Cl. ............ 52/745.21; 52/699; 52/700; 52/703; 52/704; 52/705; 52/707; 52/708; 52/709; 52/745.1

(58) Field of Classification Search ............... 52/745.21, 52/699, 700, 703, 704, 705, 707, 708, 709, 52/745.1; 411/82, 930, 525, 526, 433, 437, 411/527

See application file for complete search history.

(56) References Cited

U.S. PATENT DOCUMENTS

| | | | |
|---|---|---|---|
| 2,403,541 A * | 7/1946 | Molat | 52/711 |
| 2,691,293 A | 10/1954 | Patterson | |
| 3,430,408 A | 3/1969 | Dean | |
| 3,503,584 A | 3/1970 | Erhart et al. | |
| 3,705,469 A | 12/1972 | Eriksson | |
| 3,910,156 A | 10/1975 | Soltysik | |
| 4,040,228 A | 8/1977 | Skubic | |
| 4,109,693 A | 8/1978 | Paskert | |
| 4,130,977 A | 12/1978 | Taylor, Jr. et al. | |
| 4,143,696 A | 3/1979 | Holton et al. | |
| 4,283,899 A * | 8/1981 | Wakamiya | 52/699 |
| 4,315,393 A | 2/1982 | Schack | |
| 4,412,407 A | 11/1983 | Melfi et al. | |
| 4,642,964 A * | 2/1987 | Kellison | 52/699 |
| 4,840,524 A * | 6/1989 | Bisping et al. | 411/82 |
| 5,205,690 A | 4/1993 | Roth | |
| 5,257,490 A * | 11/1993 | Endo et al. | 52/511 |
| 5,392,573 A * | 2/1995 | Gould | 52/165 |
| 5,404,689 A * | 4/1995 | DiNarda | 52/699 |
| 5,428,936 A * | 7/1995 | Roth | 52/704 |
| 5,444,603 A | 8/1995 | Otsuka et al. | |
| 5,490,365 A * | 2/1996 | Roth | 52/704 |
| 5,542,225 A * | 8/1996 | Endo et al. | 52/511 |
| 5,562,377 A * | 10/1996 | Giannuzzi et al. | 411/82 |
| 5,787,672 A * | 8/1998 | Giannuzzi et al. | 52/698 |
| 5,794,394 A | 8/1998 | Bill et al. | |
| 5,857,817 A * | 1/1999 | Giannuzzi et al. | 411/82.3 |
| 5,895,186 A * | 4/1999 | Giannuzzi et al. | 411/82 |
| 5,913,792 A * | 6/1999 | Fischer | 52/698 |
| 5,937,609 A | 8/1999 | Roth | |
| 6,240,697 B1 * | 6/2001 | Thompson et al. | 52/698 |
| 6,393,795 B1 * | 5/2002 | Irwin et al. | 52/698 |
| 6,457,910 B1 * | 10/2002 | Ludwig et al. | 405/259.1 |

(Continued)

*Primary Examiner* — Mark Wendell
(74) *Attorney, Agent, or Firm* — J. Wiley Horton

(57) ABSTRACT

A method of securing a bolt to a concrete structure without the necessity of turning the bolt during the installation process. A first set of hardware is provided for use during the forming and casting phases of creating the concrete structure. The first set of hardware is used to embed a bolt retainer in the finished cast concrete with a passage leading from the bolt retainer to the exterior of the cast concrete. A bolt is then placed in this passage and a portion of the bolt is driven through the bolt retainer to secure it.

20 Claims, 16 Drawing Sheets

U.S. PATENT DOCUMENTS

| | | | |
|---|---|---|---|
| 6,829,871 B1 * | 12/2004 | McSherry et al. | 52/705 |
| 7,587,873 B2 * | 9/2009 | Mcsherry et al. | 52/700 |
| 7,788,860 B2 * | 9/2010 | Bartman et al. | 52/139 |
| 2009/0272067 A1 * | 11/2009 | Gilham | 52/707 |
| 2010/0290859 A1 * | 11/2010 | Noce et al. | 411/80.6 |
| 2011/0088349 A1 * | 4/2011 | Hanson | 52/699 |

* cited by examiner

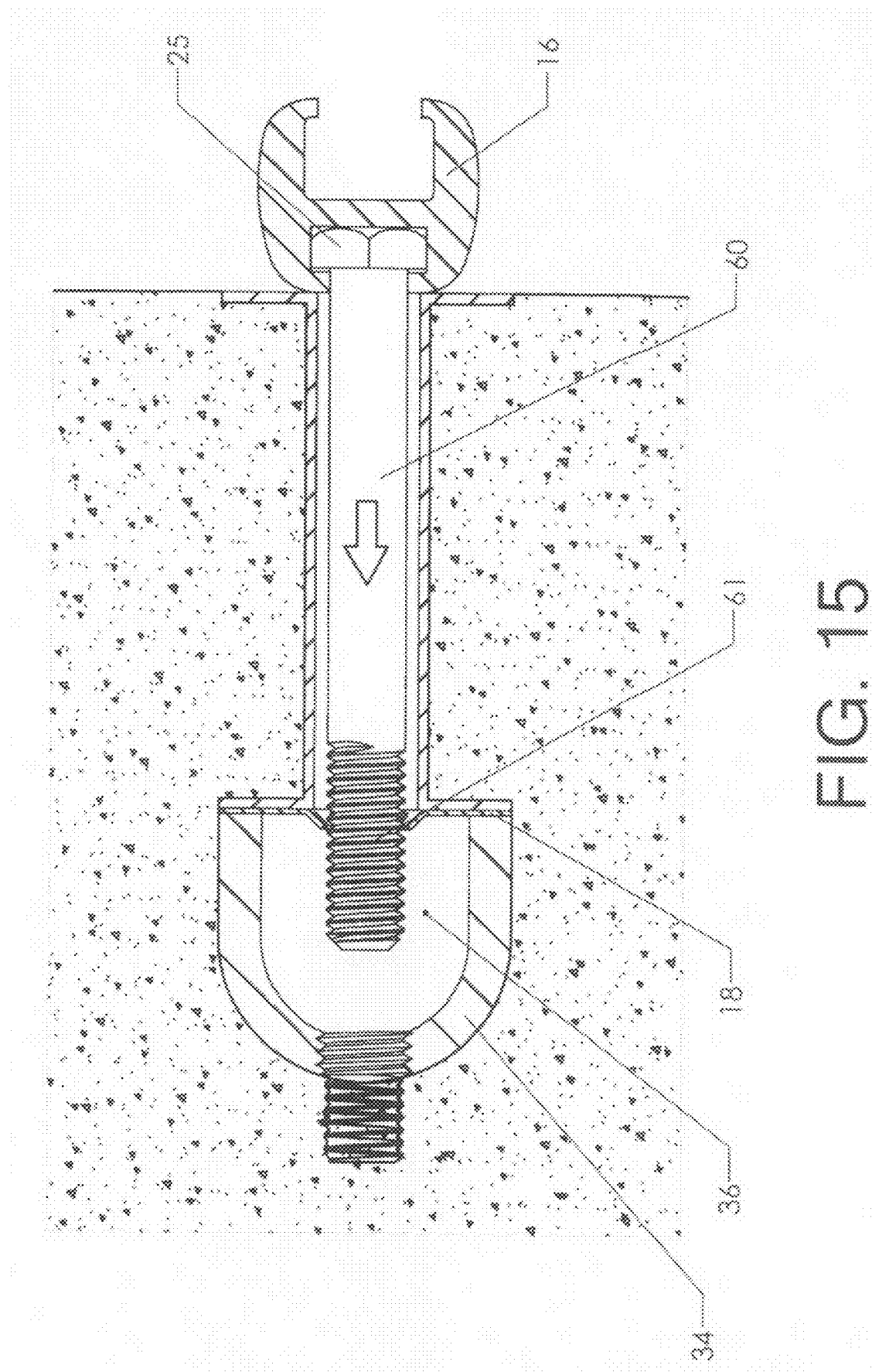

DEVICE AND METHOD FOR SECURING A BOLT IN CONCRETE

CROSS-REFERENCES TO RELATED APPLICATIONS

Not applicable.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of construction. More specifically the invention comprises a method for securing a bolt in concrete and hardware for carrying out the method.

2. Description of the Related Art

It is often desirable to attach hardware to a cast concrete structure. FIG. 1 shows a sectional elevation view of one example. Clip 16 needs to be affixed to surface 12 of concrete 10. Bolt 14 is used to anchor clip 16 in place. The bolt must generally be screwed into a threaded insert that is retained within the concrete. There are two generally accepted methods for securing the insert within the concrete. The first method is to simply place the insert into the form and pour the concrete around it (using appropriate guards to prevent the concrete from flowing into unwanted areas such as the threads). The second approach is to install the insert after the concrete has hardened. In the latter approach, a hole is drilled into the concrete and the insert is secured in the hole by friction, through the use of an adhesive, or often a combination of the two.

In either approach, a bolt must be threaded into the insert and turned to draw it tight. The necessity of turning the bolt presents a problem in some circumstances. One of these is illustrated in FIG. 1.

Clip 16 is typically an extruded aluminum piece which can be placed over the head 25 of a bolt 14 as shown. One channel in the clip attaches to the bolt and the opposite channel (on the right side in the orientation shown in the view) is used to receive a long rectangular rail. From the vantage point depicted in FIG. 1, the rail would extend into and out of the page at a right angle.

Such clips are typically used to attach a long rail to 10 or more bolts spaced at something like four foot intervals. Clips 16 may be connected to the bolts fairly easily. However, the contractor is then forced to slide a very long rail through a series of clips—an unwieldy process at best. It would be preferable to feed the clips onto the rail before it is attached to the concrete, then offer the rail assembly up to the concrete with the clips and bolts attached and fasten the bolts into the concrete. Of course, in this arrangement, it would not be possible to turn the bolts. The bolts have to be fastened by driving them inward rather than turning a threaded engagement.

The reader will thereby appreciate that the prior art methods of securing a bolt—as illustrated by the example of FIG. 1—do not work well for some items that need to be attached to a concrete structure. The reader should also appreciate the fact that the example given is not unique. Many types of hardware entail the same installation difficulties as the assembly of a long rail to clips 16. Thus, it would be advantageous to provide a method of securing a bolt to concrete that does not require the turning of the bolt.

BRIEF SUMMARY OF THE INVENTION

The present invention comprises a method of securing a bolt to a concrete structure without the necessity of turning the bolt during the installation process. A first set of hardware is provided for use during the forming and casting phases of creating the concrete structure. The first set of hardware includes a flanged tube, a bolt retainer, and a domed cap. The bolt retainer is a disk including a central through hole. The bolt retainer has an inward facing side (facing the interior of the concrete structure) and an outward facing side. It is sandwiched between the flanged tube and the domed cap. This assembly is then secured to a concrete form using a separate installation bolt, which is passed through the interior of the flanged tube, through the central through hole in the bolt retainer, and threaded into a threaded hole in the domed cap.

Concrete is then poured around the assembly and allowed to harden. The flanged tube prevents concrete from covering the outward facing side of the bolt retainer. The domed cap prevents concrete from covering the inward facing side of the bolt retainer. Once the concrete has hardened, the installation bolt is removed.

The result is a smooth access passage through the concrete to the outward facing side of the bolt retainer. The domed cap provides a cavity on the inward facing side of the bolt retainer. An anchor bolt is fed into the smooth access passage. The through hole in the bolt retainer is smaller in diameter than the major threads on the anchor bolt. The anchor bolts driven through the through hole in the bolt retainer by forcing it into the concrete structure (rather than by turning). The mechanical interference between the threads on the anchor bolt and the through hole in the bolt retainer then retain the bolt in place. Surface relief features are preferably provided on the bolt retainer proximate the through hole. These allow the material proximate the through hole to more easily deflect in order to allow the passage of the anchor bolt.

BRIEF DESCRIPTION OF THE SEVERAL VIEWS OF THE DRAWINGS

FIG. 15 is a sectional elevation view, showing an anchor bolt installed using the present inventive method and hardware.

Figure 1:
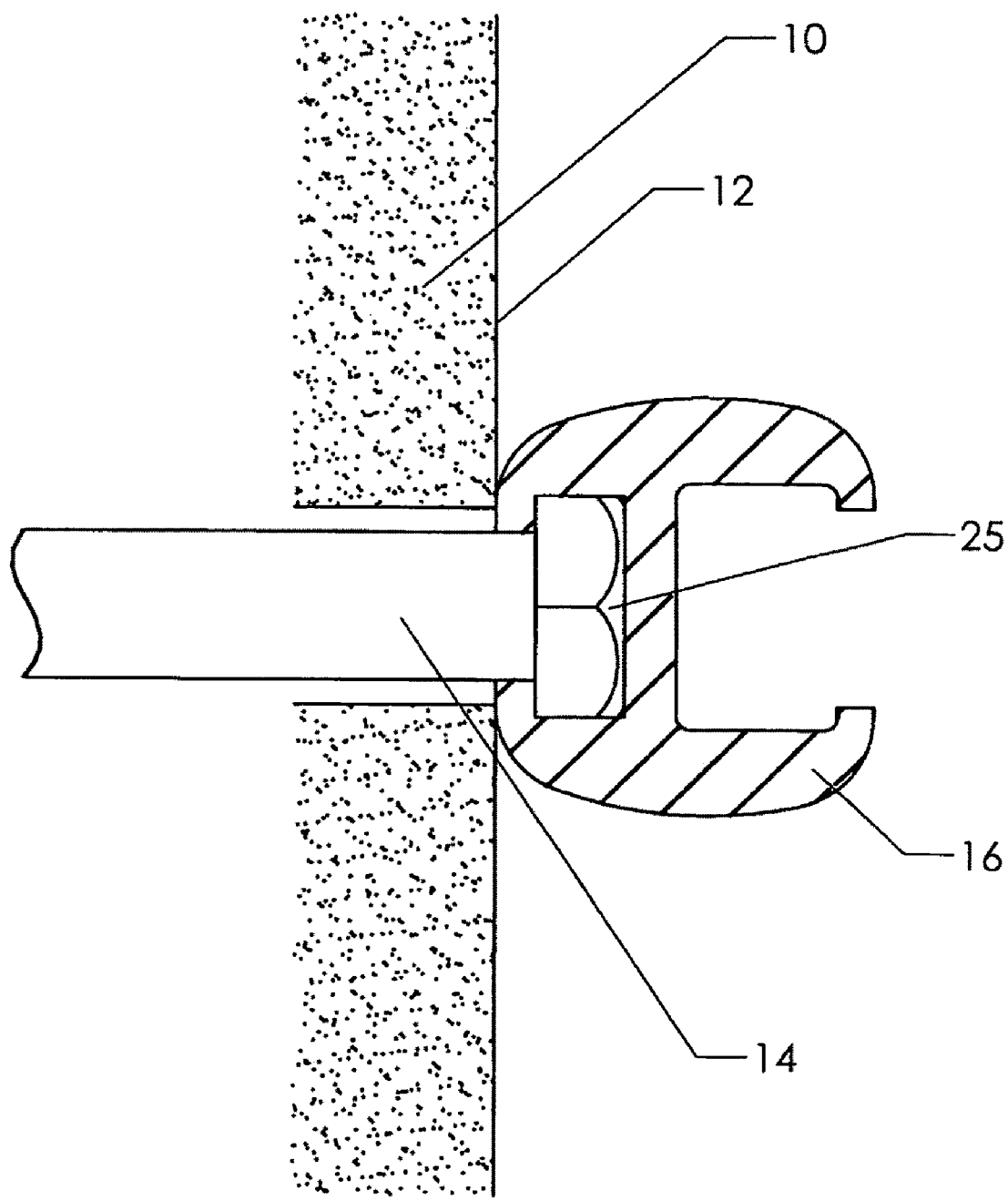
FIG. 1 is a sectional elevation view, showing a prior art clip affixed to a concrete surface by a bolt.

REFERENCE NUMERALS IN THE DRAWINGS 10 concrete
12 surface
14 bolt
16 clip
18 bolt retainer
20 bearing face
22 through hole
24 central axis
25 head
26 angled perimeter
28 retaining edge
29 slot
30 domed cap
32 threaded hole
34 dome wall
36 cavity
38 flanged tube
40 bore
42 inner flange
44 tube
46 outer flange
48 flange
50 threaded portion
52 enlarged portion
54 unthreaded portion
56 alternate installation bolt
58 sleeve
60 anchor bolt
61 threaded portion
62 cap retainer
64 concrete form
65 washer
66 form hole

DETAILED DESCRIPTION OF THE INVENTION

Figure 2:
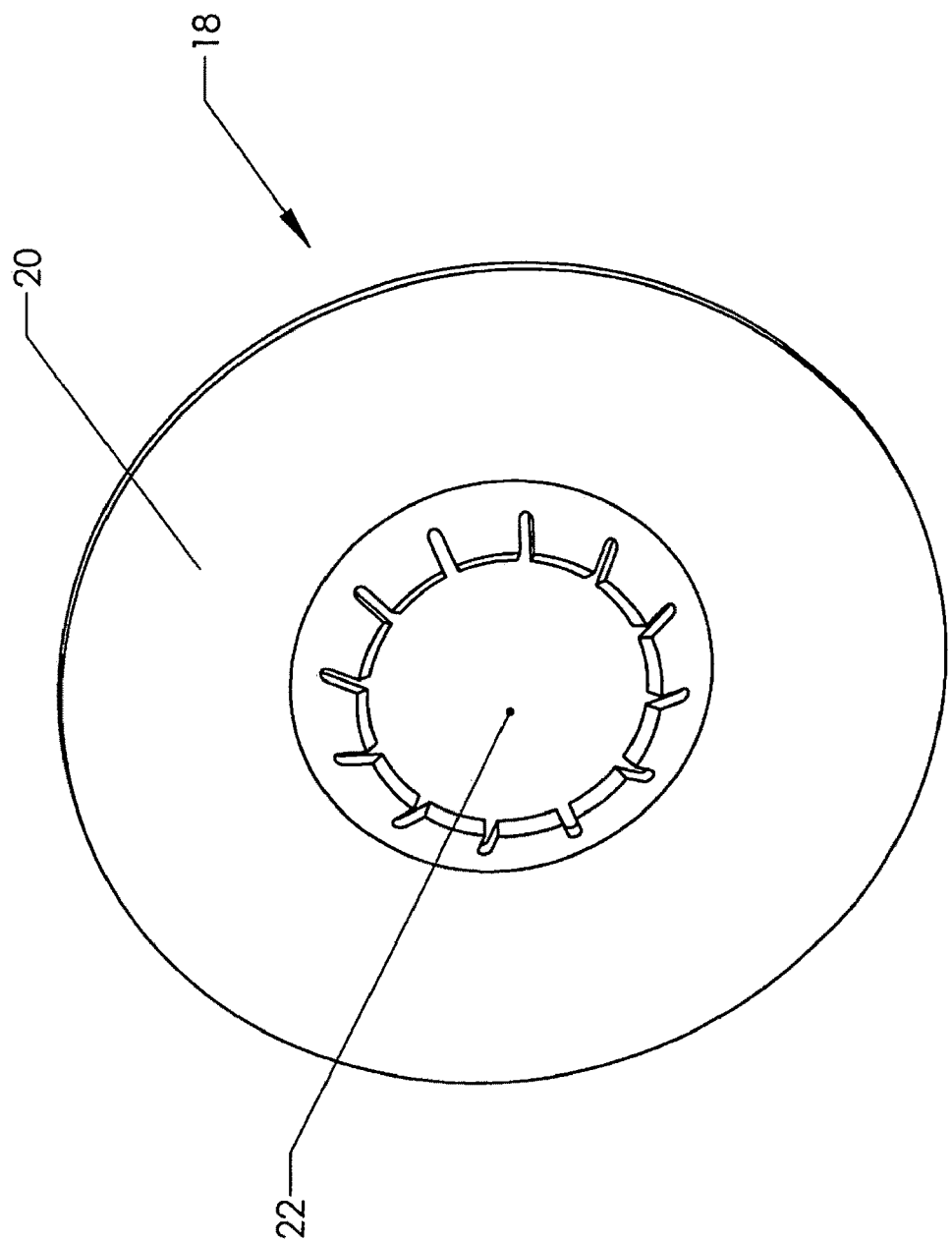
FIG. 2 is a perspective view, showing the bolt retainer.

The present invention employs an assembly of components to properly locate a bolt retainer within a cast concrete structure. Bolt retainer 18 is shown in FIG. 2. The embodiment shown is round, but other shapes may be used as well. Each side of the bolt retainer preferably has a large bearing face 20 to evenly distribute the loads placed by this component on the concrete. A central passage through the bolt retainer is provided. In the embodiment shown the central passage assumes the form of through hole 22.

Figure 3:
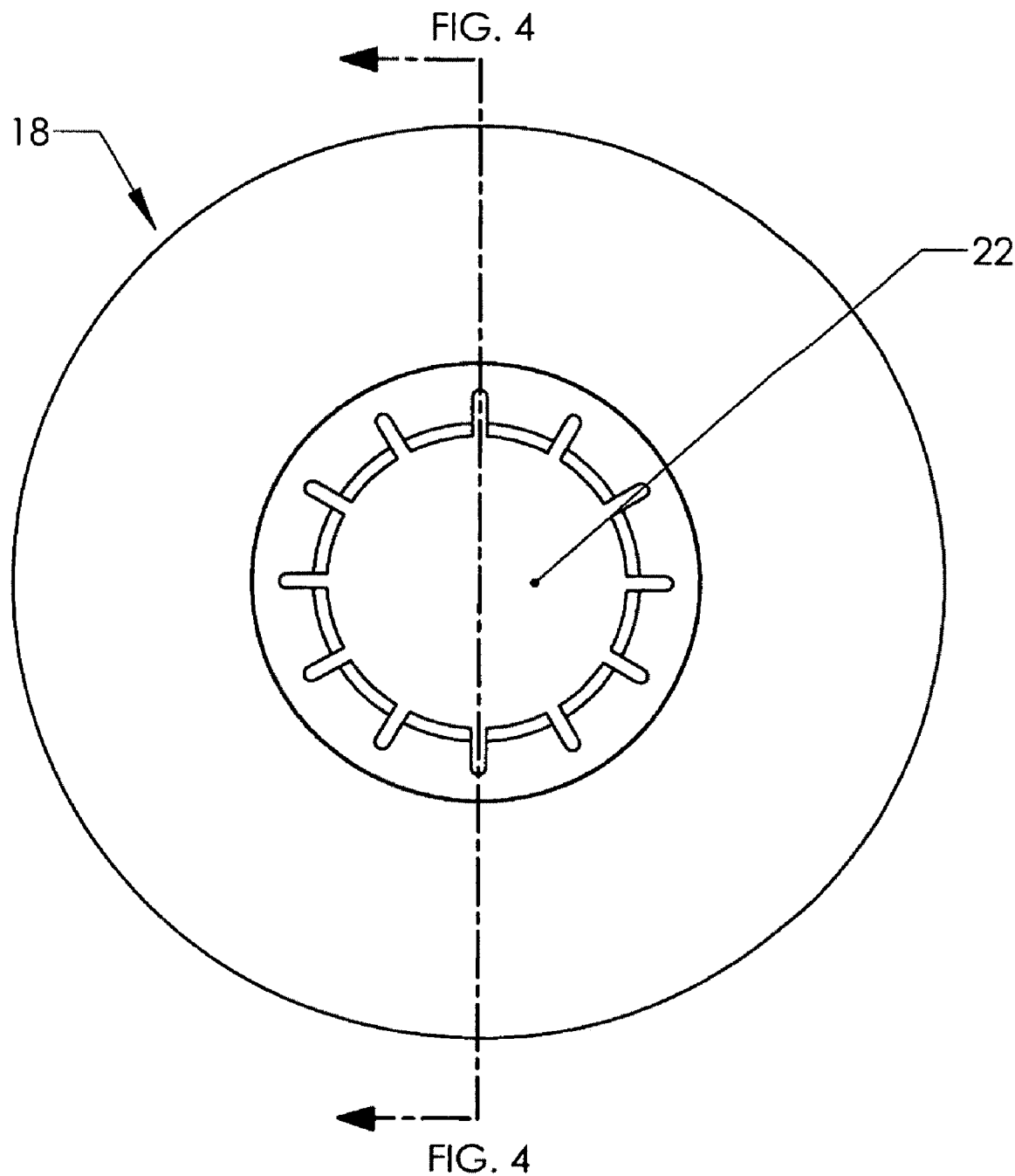
FIG. 3 is a plan view, showing the bolt retainer.
Figure 4:
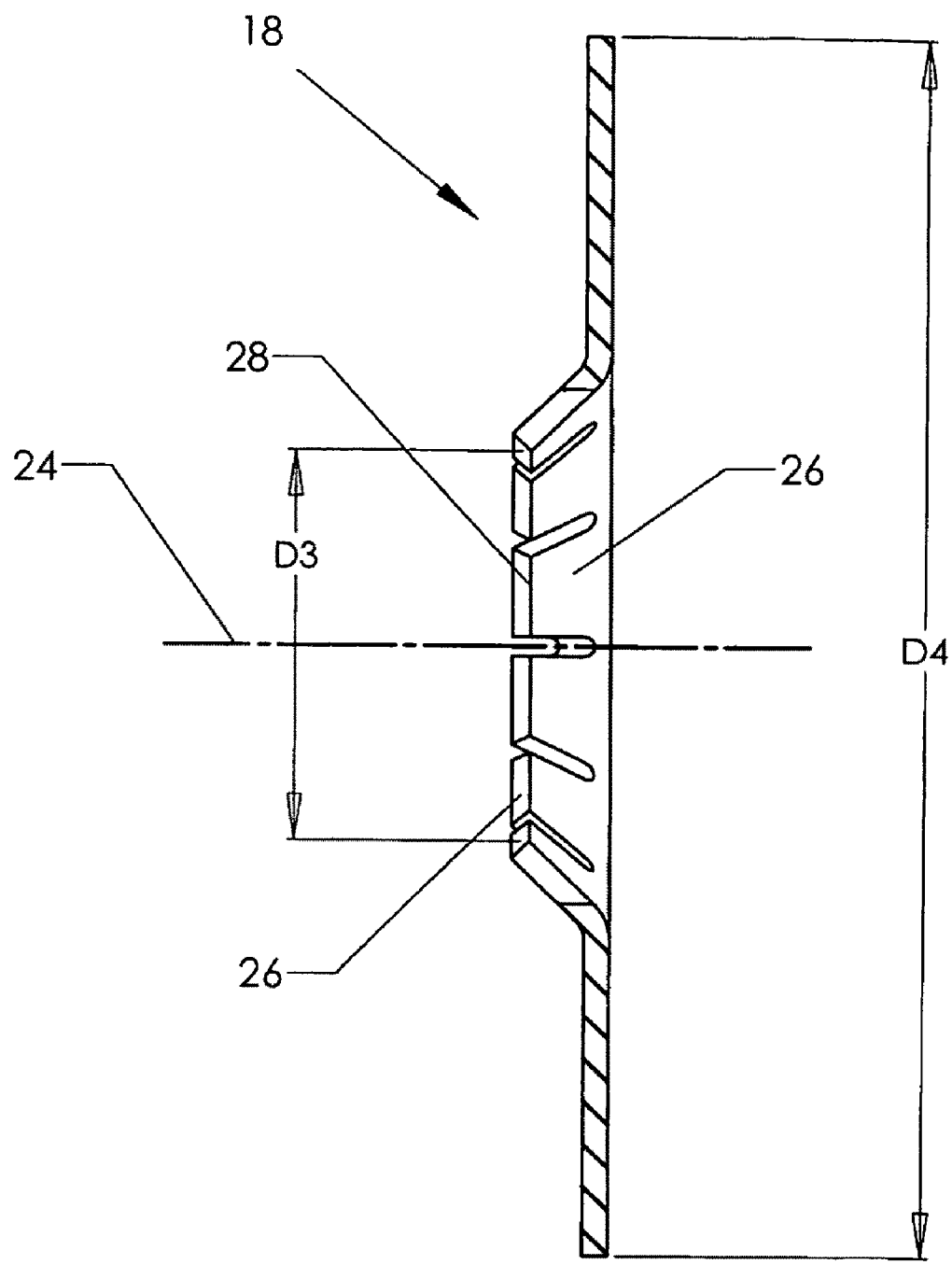
FIG. 4 is a sectional view, showing the bolt retainer.

FIG. 3 shows a plan view of bolt retainer 18. FIG. 4 is a sectional view taken through the center of the bolt retainer. The embodiment shown is radially symmetric about central axis 24. Angled perimeter is provided around through hole 22. If the first side of the bolt retainer is on the right in FIG. 4 and the second side is on the left, then angled perimeter 26 protrudes outward from the second side. It preferably includes a retaining edge 28. Retaining edge 28 defines the smallest part of the passage through the bolt retainer. In the circular embodiment shown, it has a diameter D3.

Angled perimeter 26 and retaining edge 28 are configured to allow an anchor bolt to be driven through the bolt retainer from right to left in the perspective shown in the view. However, the angled perimeter and retaining edge will prevent the bolt being pulled back out to the right. The engagement between the angled perimeter and an anchor bolt will be described in more detail subsequently, but those skilled in the art will immediately perceive that angled perimeter 26 must deflect somewhat to allow the passage of an anchor bolt which is large enough to bear against retaining edge 28.

FIG. 4A is a perspective view showing the second side of bolt retainer 18 (from which angled perimeter 26 protrudes. Stress-relieving features are preferably added to allow the angled perimeter to more easily deflect. In the embodiment shown, a plurality of radial slots 29 is provided. These convert the angled perimeter into a radial array of inwardly extending "fingers."

Figure 5:
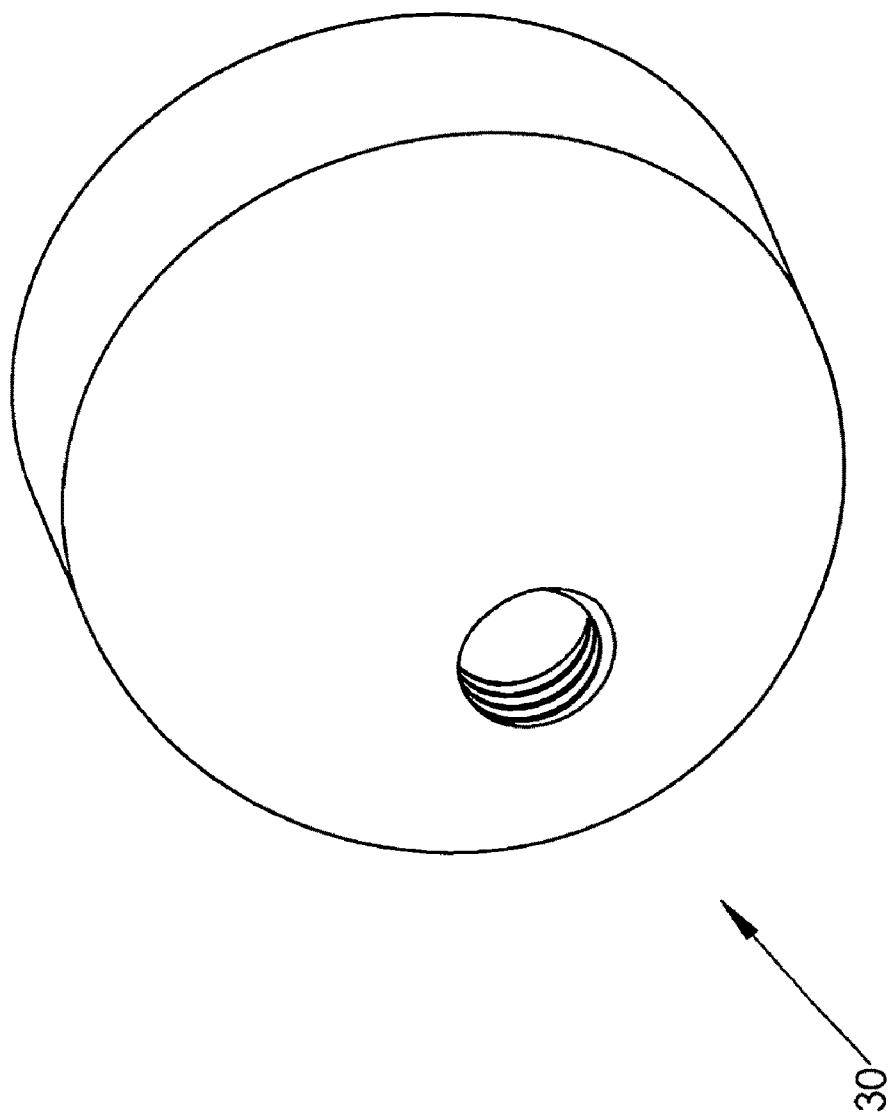
FIG. 5 is a perspective view, showing the domed cap.
Figure 6:
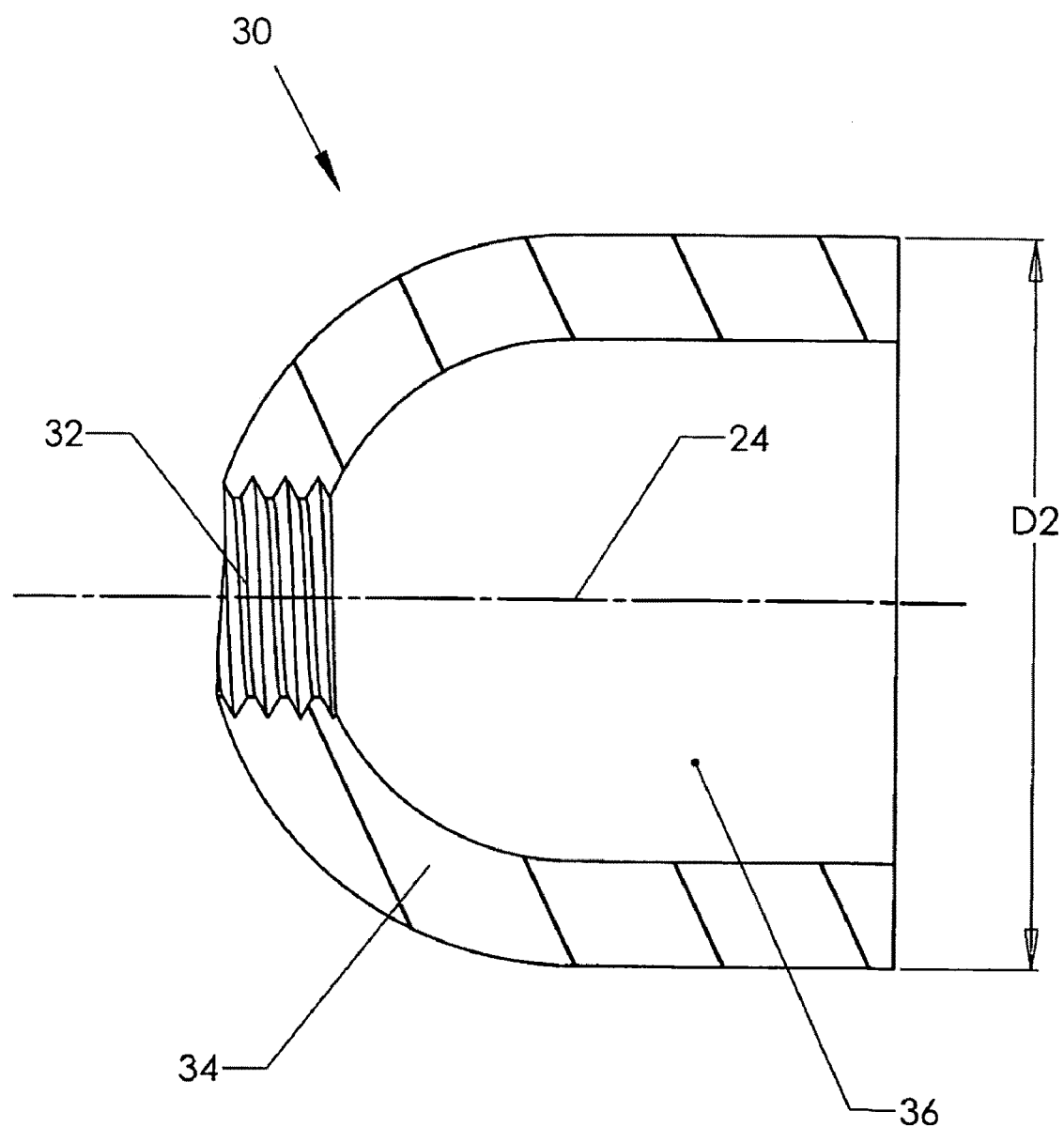
FIG. 6 is a sectional elevation view, showing the domed cap.

The rest of the components used in the installation process will now be described. FIG. 5 shows domed cap 30. FIG. 6 shows this component in a sectional elevation view. The embodiment illustrated is radially symmetric about central axis 24. Dome wall 34 creates an open end (to the right in the view) of the cap and a closed end (to the left in the view). Threaded hole 32 passes through the closed end. The outer wall in this embodiment has a diameter "D2." The interior of the cap is hollow, forming cavity 36.

Figure 7:
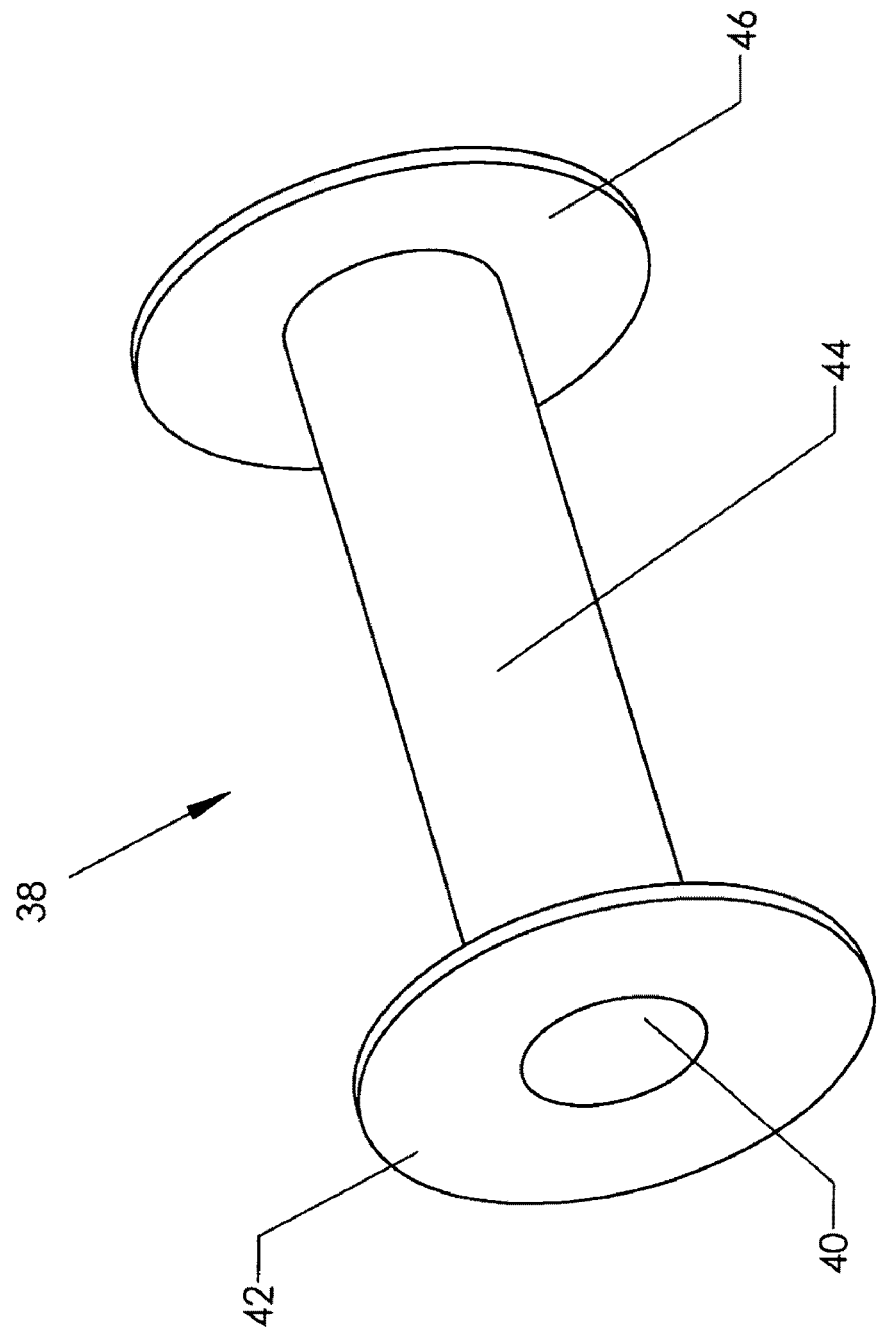
FIG. 7 is a perspective view, showing the flanged tube.

FIG. 7 shows flanged tube 38. Tube 44 includes an inner flange 42 and an outer flange 46. Bore 40 passes completely through from the inner flange to the outer flange. It is preferable to have the flanges extend outward a significant distance in order to provide large bearing surfaces. However, those skilled in the art will realize that a tube having sufficient wall thickness could be used without any outwardly extending flanges. In such an embodiment, the inner and outer flanges would simply be the ends of the tubes.

Figure 8:
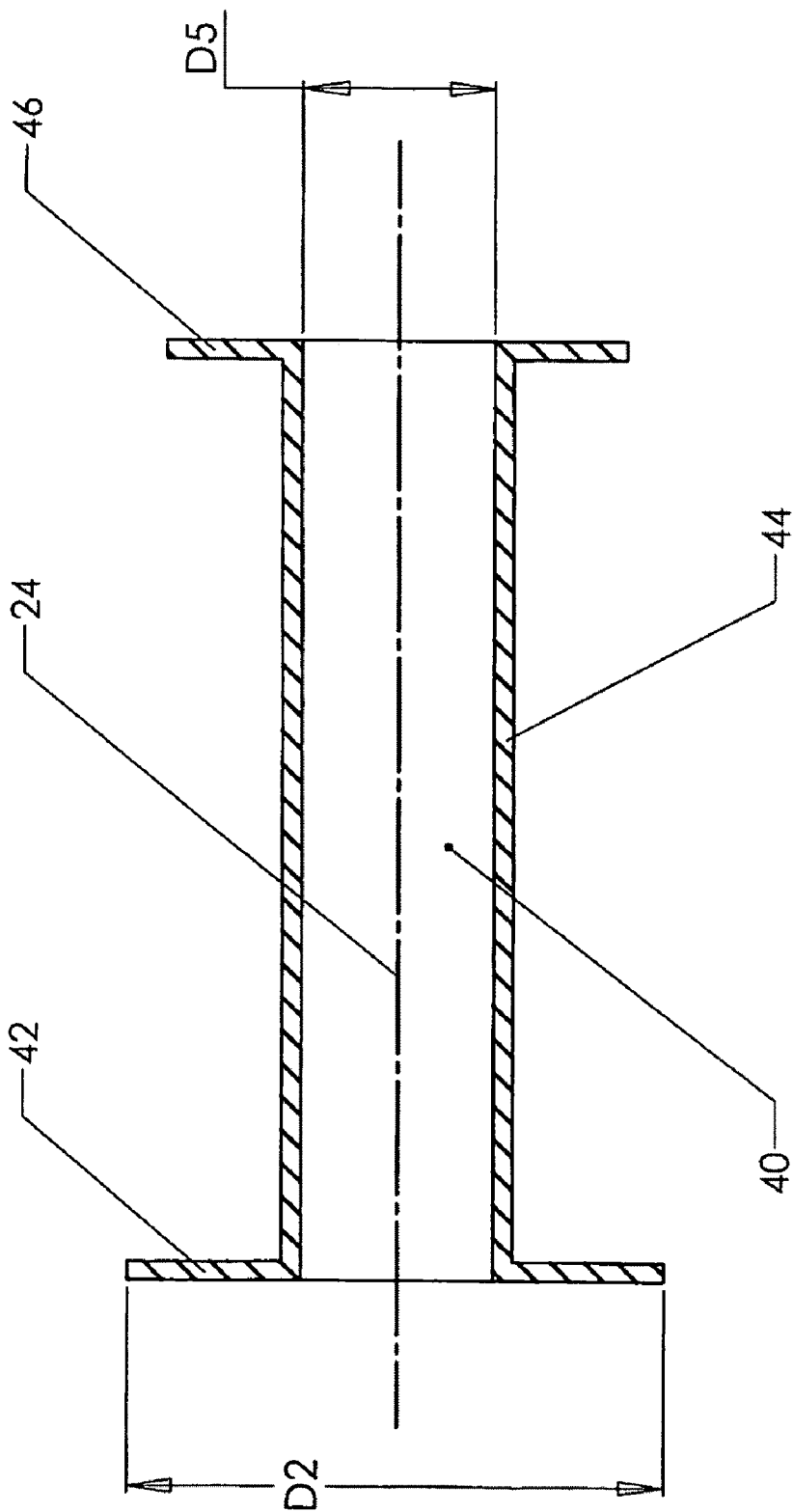
FIG. 8 is a sectional elevation view, showing the flanged tube.

FIG. 8 shows a sectional elevation view through the flanged tube of FIG. 7. The embodiment shown is radially symmetric about central axis 24. Inner flange 42 preferably has an outer diameter "D2" to match the outer diameter of the cap. Bore 40 has a diameter "D5."

Figure 9:
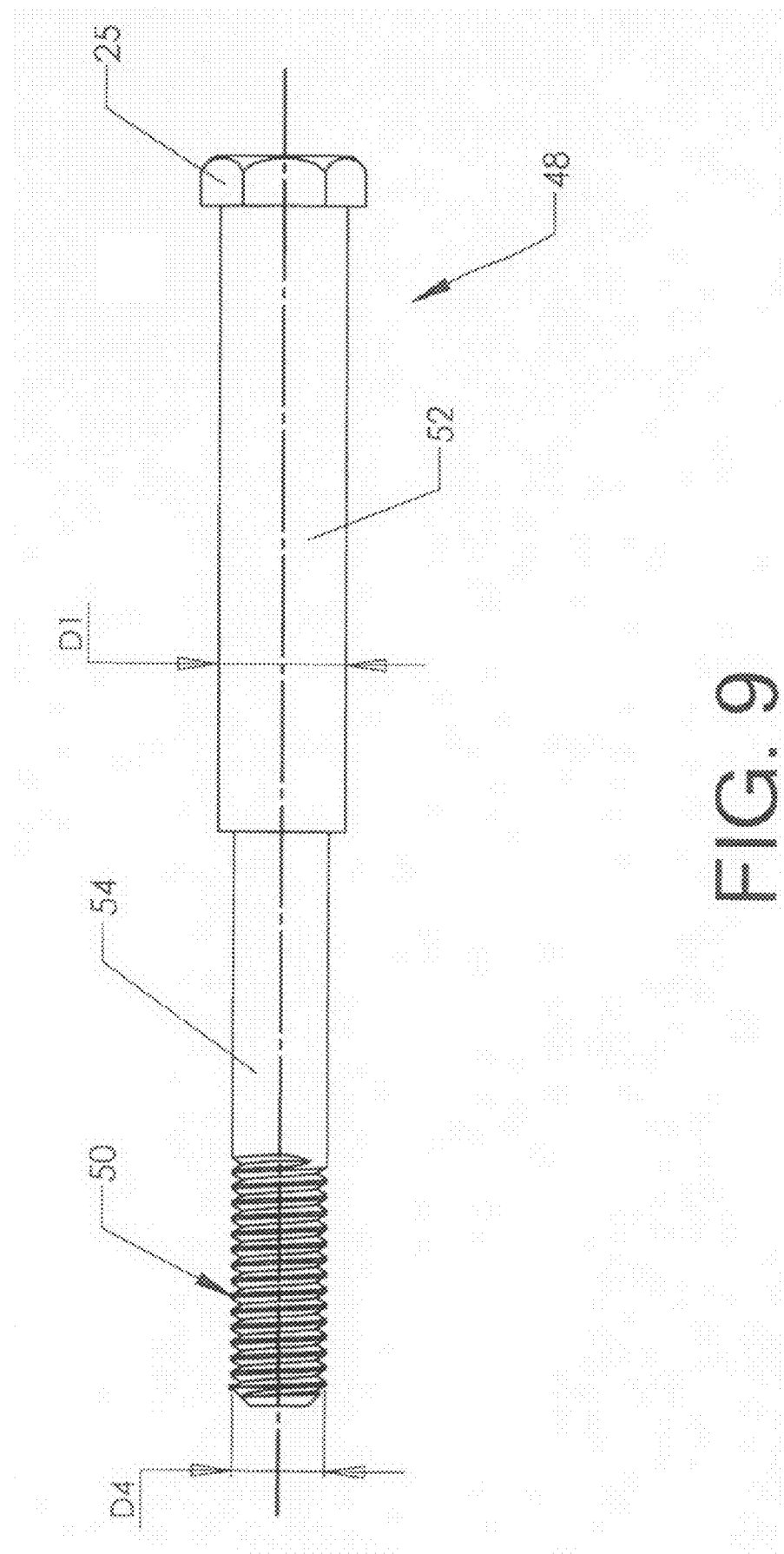
FIG. 9 is an elevation view, showing the installation bolt.

FIG. 9 shows installation bolt 48. It contains a conventional head 25 connected to a shaft. The shaft includes enlarged portion 52, which has diameter "D1." D1 is preferably made slightly smaller than D5 so that the enlarged portion is a close sliding fit within bore 40 of tube 44. Unthreaded portion 54 is preferably of a smaller diameter. Threaded portion 50 has a major diameter "D4." D4 is made small enough to pass through the passage through bolt retainer 18 without interfering with retaining edge 28. In other words, D4 is made smaller than D3. Threaded portion 50 is also preferably sized to thread into threaded hole 32 in domed cap 30.

Figure 10:
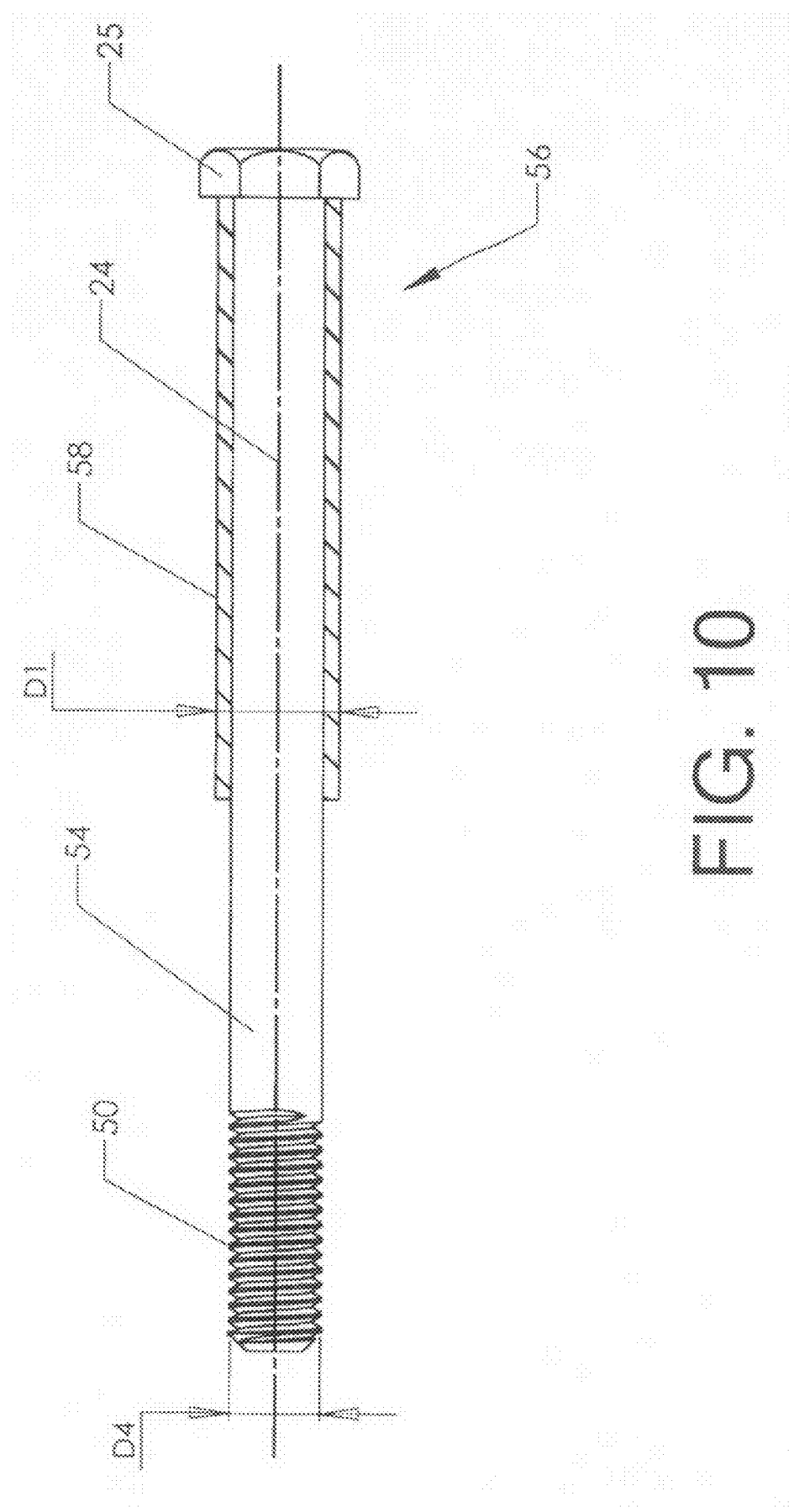
FIG. 10 is an elevation view with a partial section, showing an alternate embodiment of the installation bolt.

FIG. 10 shows alternate installation bolt 56. In this embodiment, the enlarged portion is created by slipping sleeve 58 (shown sectioned) over the unthreaded portion of a conventional bolt. This may represent a cost savings as the embodiment of FIG. 9 would likely be a "custom" manufacturing job. Whichever embodiment is used, the function is the same.

Figure 11:
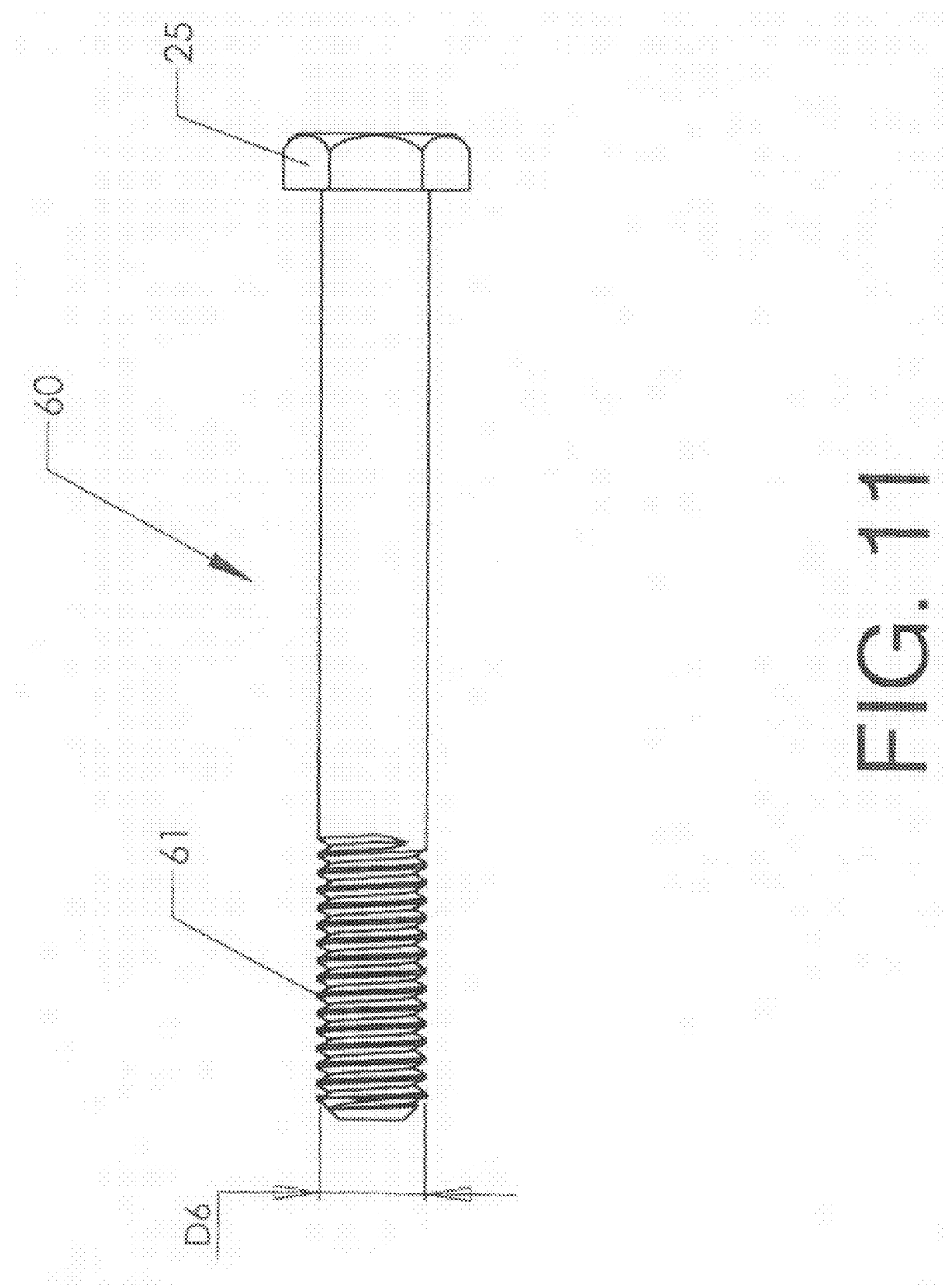
FIG. 11 is an elevation view, showing the anchor bolt.

Finally, FIG. 11 shows anchor bolt 60. This is a conventional bolt which will be locked into bolt retainer 18 using the inventive method and other components. Threaded portion 61 has a major diameter "D6" which is large enough to engage retaining edge 28 of angled perimeter 26. In other words, D6 is made larger than D3. D6 is preferably also made slightly smaller than D5.

Figure 12:
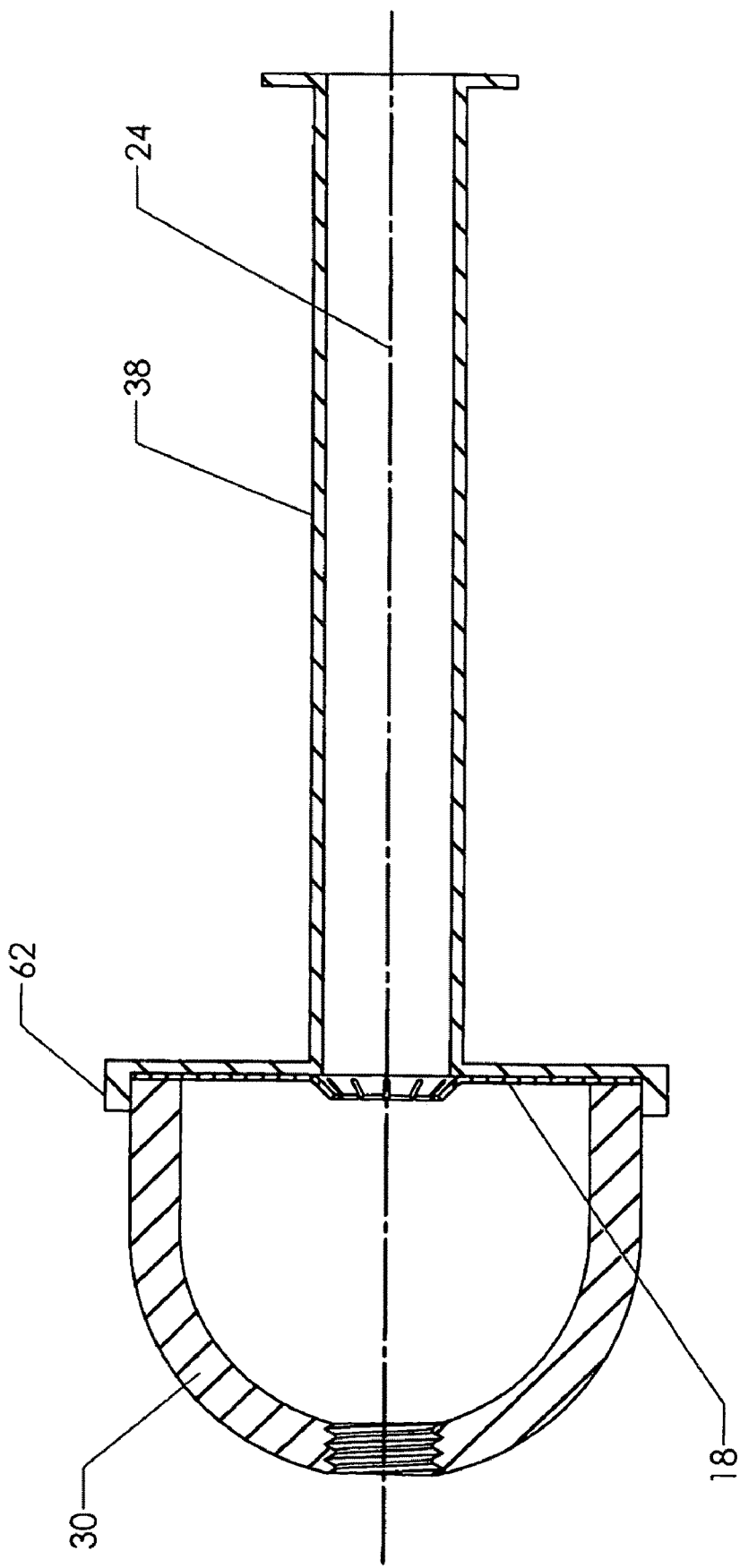
FIG. 12 is a sectional elevation view, showing an assembly of the domed cap, the bolt retainer, and the flanged tube.

The process for carrying out the inventive method will now be described in detail. The components described previously are intended to align and fit together. FIG. 12 shows an assembly of domed cap 30, bolt retainer 18, and flanged tube 38. All the components are aligned with central axis 24. In the embodiment shown, the bolt retainer is sandwiched between the domed cap and the flanged tube.

It is preferable to provide alignment features to facilitate proper alignment. Cap retainer 62 may be provided for this purpose. It encloses the open end of the domed cap to properly locate it. The outer diameter of bolt retainer 18 is sized to slide inside cap retainer 62. Thus, the cap retainer aids in the alignment of all three components shown. While cap retainer 62 is shown as an integral feature of flanged tube 62, it may be made as a separate piece as well. The cap retainer may also be configured to hold the cap in place during assembly, thereby simplifying things for the user.

It is preferable to make the installation bolt a close sliding fit inside the flanged tube. This will ensure the correct alignment of domed cap 30 with the other components. Thus, the cap retainer is not really necessary to the function of the invention. It is an optional feature which may be omitted entirely.

Figure 13:
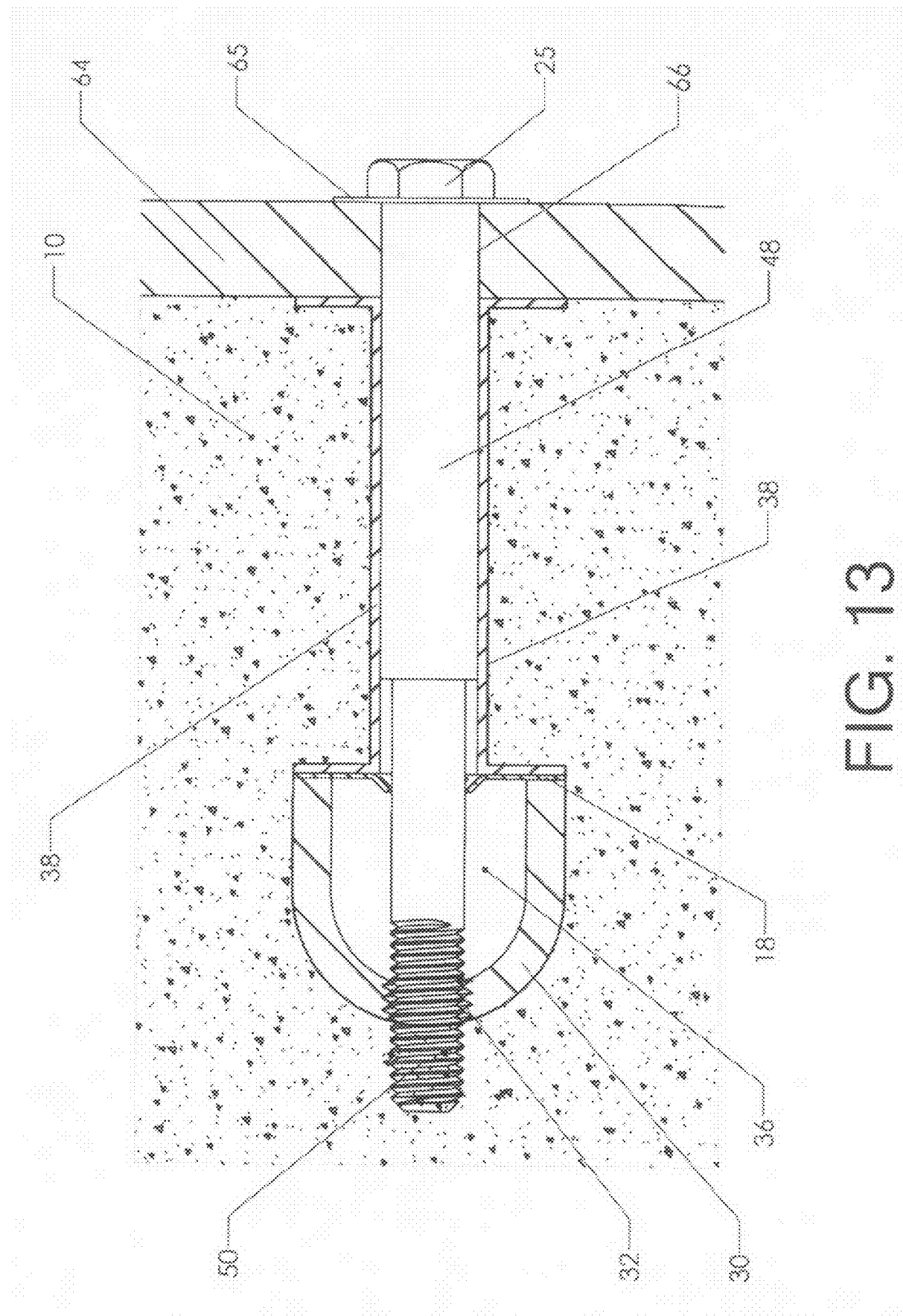
FIG. 13 is a sectional elevation view, showing the assembly of FIG. 12 placed into a concrete form and secured by an installation bolt, with the concrete poured around the assembly.

Those skilled in the art will know that concrete structures are typically made by creating a hollow form and pouring liquid concrete into the form. After the concrete hardens, the form is removed. Forms are typically made of wood or metal panels. FIG. 13 is a sectional elevation view showing concrete form 64. The portion shown is only one wall, and there will typically be several walls bounding the volume into which the concrete is to be poured.

Concrete form 64 has a form hole 66 passing through it. Installation bolt 48 is passed through this form hole, with the head 25 and washer 65 lying against the outward facing side of the concrete form. The assembly of FIG. 12 is then slid along the inward facing portion of the installation bolt until threaded portion 50 engages threaded hole 32 in domed cap 30. The bolt is then turned so that the threaded engagement draws domed cap toward concrete form 64. Once the installation bolt is tightened, the configuration shown in FIG. 13 will result.

The flanged tube, bolt retainer, and domed cap may be installed one at a time onto the installation bolt, or they may be assembled as groups of two or more parts. Those skilled in the art will know that many different mechanical engagement features could be substituted for the threaded engagement depicted between the installation bolt and the domed cap. For example, the hole through the domed cap could simply be an enlarged through hole. A washer and nut could then be secured on the exposed threaded portion 50 protruding beyond the through hole.

The assembly is tightened in the position shown before concrete is poured around it. The first side of bolt retainer 18 is covered by flanged tube 38. The second side of the bolt retainer (facing to the left as shown in the view), is protected by the domed cap, which creates cavity 36.

Figure 14:
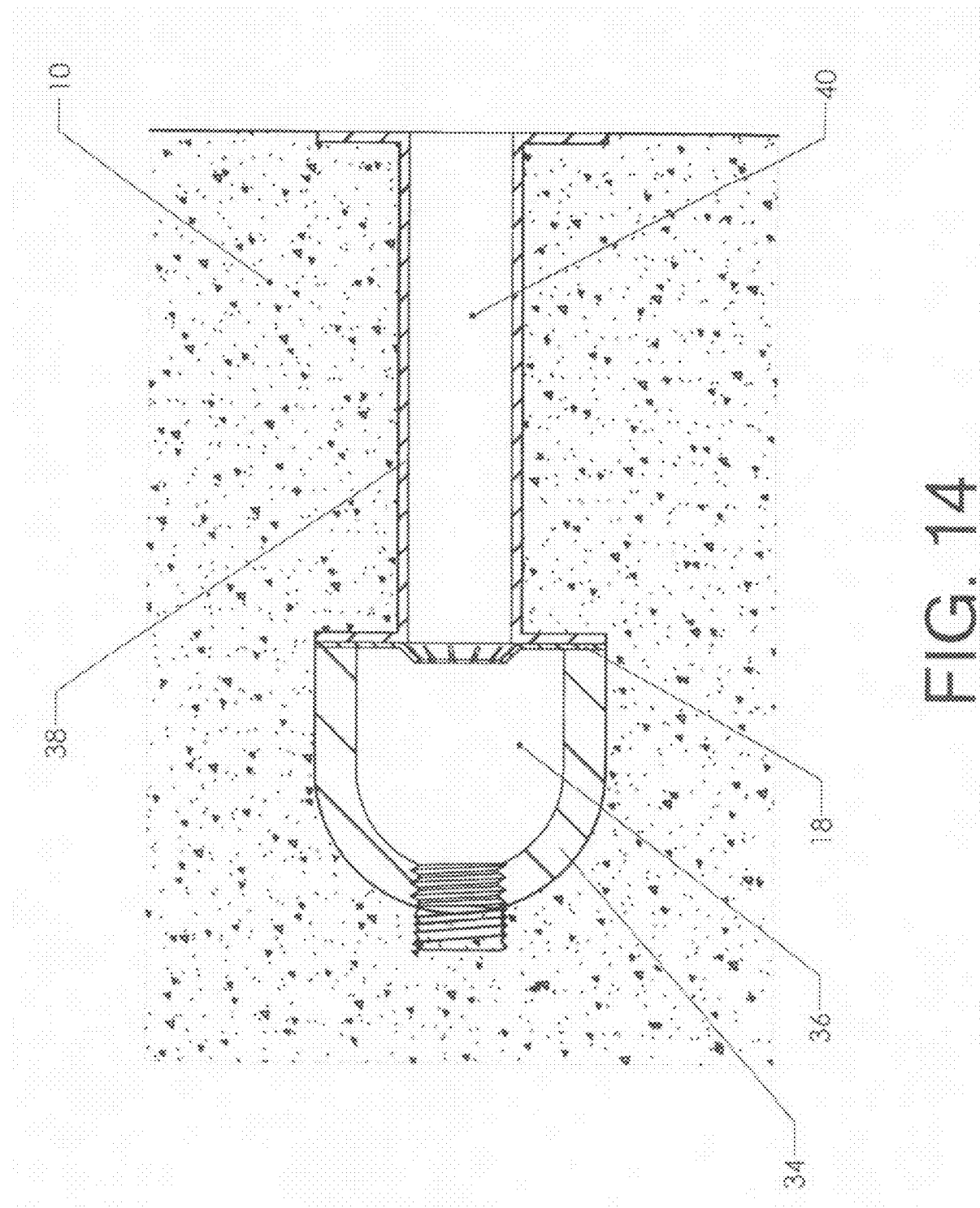
FIG. 14 is a sectional elevation view, showing the assembly of FIG. 13 after the concrete has hardened and the installation bolt has been removed.

Liquid concrete is then poured into the form. Concrete 10 will harden around the assembly as shown in FIG. 13. After the concrete is set, the user removes installation bolt 48 by turning it to disengage threaded portion 50 and pulling it out. Once the installation bolt is removed, the configuration of FIG. 14 results. Dome wall 34 creates cavity 36 on the second side of bolt retainer 18. Flanged tube 38 provides access to the first side of the bolt retainer through bore 40.

Figure 4B:
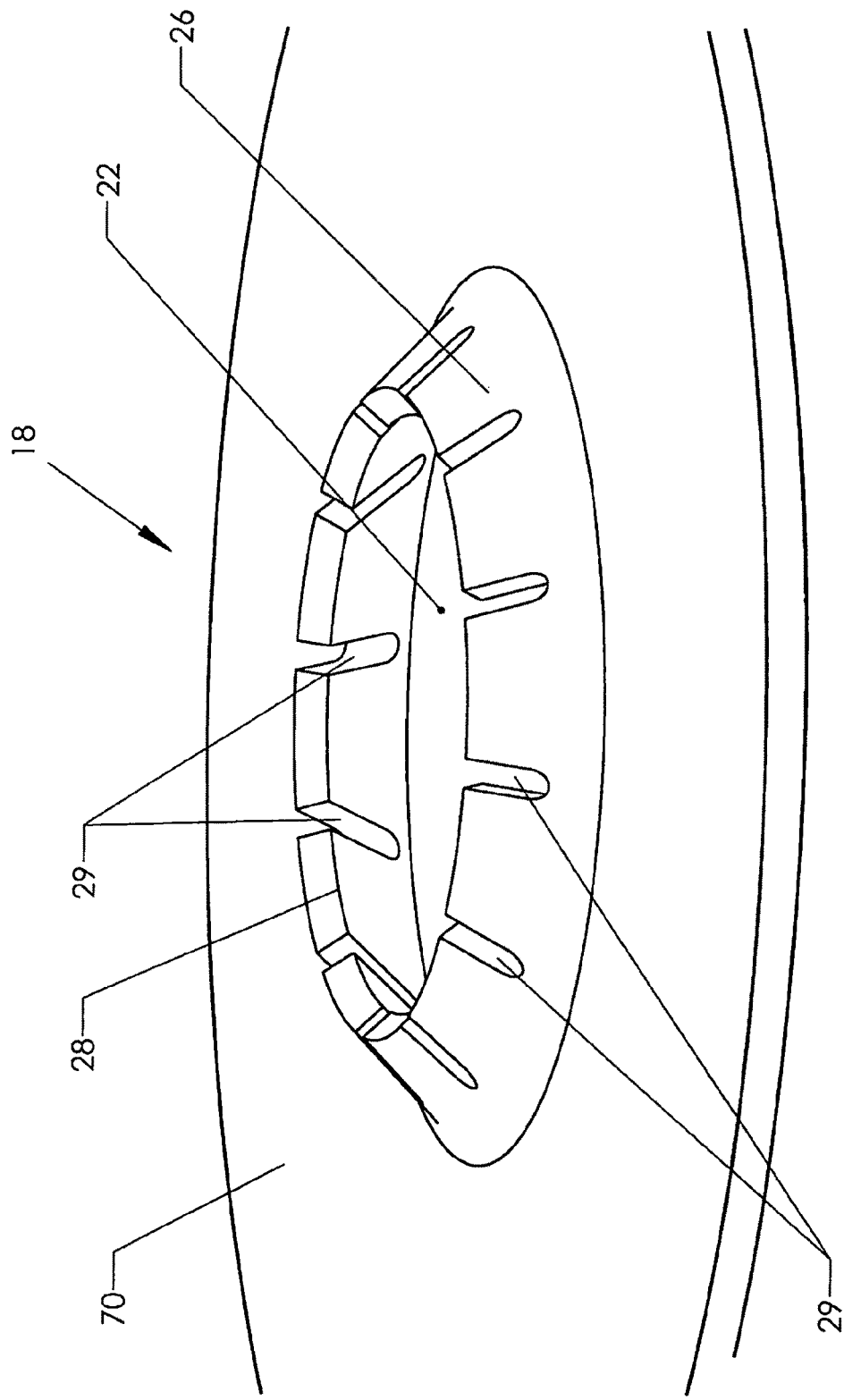
FIG. 4B is a sectional elevation view, showing the through hole of the bolt retainer.

Turning now to FIG. 5, anchor bolt 60 can be installed by driving threaded portion 61 through the engagement features located on the passage through bolt retainer 18. Returning briefly to FIG. 4B, the reader will recall the geometry surrounding through hole 22. Those skilled in the art will readily appreciate that a bolt can be selected so that the major diameter of its threads will interfere with retaining edge 28. This bolt could then be forced past retaining edge 28, since angled perimeter 26 will naturally deflect to allow travel of the bolt in the first direction (which would be upward in the orientation shown in FIG. 4B). However, those skilled in the art will also readily appreciate that the angled perimeter would tend to prevent the bolt being pulled back in the opposite direction (downward in the orientation shown in FIG. 4B). Thus, the retaining feature or features provided on the perimeter of through hole 22 will allow an anchor bolt to be driven into the concrete structure, but not pulled back out.

Returning now to FIG. 15, the reader will appreciate that several assemblies such as depicted can be spaced on a line in a concrete structure. The anchor bolts 60 can then be driven into the bolt retainers and secured without having to turn the anchor bolts.

It is desirable in some circumstances to permit the removal of anchor bolt 60 by rotating it so that its threads will back it out of bolt retainer 18. In the assembly shown in FIG. 15, the bolt retainer may break free from the surrounding concrete and then begin to rotate with the rotating bolt—making removal impossible. In this instance it is desirable to provide features to prevent the rotation of the bolt retainer. Mechanical interlocking features can be provided to lock the bolt retainer to the domed cap, the flanged tube, or both. A toothed engagement between the components is one example of such a feature.

In addition, the surfaces of the bolt retainer, the domed cap, and/or, the flanged tube which contact the surrounding concrete can be provided with perturbations which tend to lock these surfaces to the concrete. Any of these approaches would serve to arrest the rotation of the bolt retainer.

Many variations on the embodiment shown will be apparent to those skilled in the art. It is convenient to use an anchor bolt having conventional helical threads—since these are widely available. However, one could use an anchor bolt having a series of ribs instead. One could also—in some circumstances having minimal pull-out forces—use an anchor bolt having just a smooth exterior.

The preceding description contains significant detail regarding the novel aspects of the present invention. It should not be construed, however, as limiting the scope of the invention but rather as providing illustrations of the preferred embodiments of the invention. Thus, the scope of the invention should be fixed by the following claims, rather than by the examples given.

The invention claimed is:

1. A method for securing an anchor bolt in a concrete structure, said concrete structure being created by pouring liquid concrete into a form and allowing said concrete to harden, said form having an inward facing side, an outward facing side, and at least one form hole passing therebetween, comprising:
   a. providing a bolt retainer having a first side, a second side, and a through hole passing from said first side to said second side;
   b. said through hole having a retaining edge having a first diameter;
   c. providing an anchor bolt having a threaded portion, with said threaded portion being sized to engage said retaining edge;
   d. providing a tube having a bore, an inner flange and an outer flange;
   e. providing a cap having an open end and a closed end, said cap including a threaded hole passing through said closed end;
   f. providing an installation bolt having a head and a threaded portion configured to engage said threaded hole in said cap;

g. placing said second side of said bolt retainer against said inner flange of said tube;

h. placing said open end of said cap against said first side of said bolt retainer, so that a cavity is formed on said second side of said bolt retainer;

i. placing said outer flange of said tube against said inward facing side of said form in a position whereby said bore of said tube aligns with said form hole;

j. passing said installation bolt through said form hole while leaving said head of said installation bolt outside of said outward facing side of said form;

k. passing said threaded portion of said installation bolt through said bore, through said through hole in said bolt retainer and threading said threaded portion into said threaded hole in said cap;

l. tightening said installation bolt so that said cap, said bolt retainer, and said tube are drawn together and drawn against said inward facing side of said form;

m. pouring said liquid concrete into said form and allowing said concrete to harden;

n. removing said installation bolt;

o. removing said form; and p. driving said anchor bolt through said bore and through said through hole in said bolt retainer, thereby securing said anchor bolt to said concrete structure.

2. A method for securing an anchor bolt as recited in claim 1, wherein:

a. said through hole passing from said first side to said second side of said bolt retainer is bounded by an angled perimeter which protrudes outward from said second side; and b. said retaining edge being located on said angled perimeter.

3. A method for securing an anchor bolt as recited in claim 2, said angled perimeter containing a plurality of radial slots.

4. A method for securing an anchor bolt as recited in claim 1, wherein said threaded portion of said installation bolt is smaller than said diameter of said retaining edge, so that said threaded portion of said installation bolt can pass through said retaining edge without engaging said retaining edge.

5. A method for securing an anchor bolt as recited in claim 4, wherein:

a. said bore in said tube has a bore diameter which is larger than said diameter of said retaining edge; and b. said installation bolt has an enlarged portion which is a close sliding fit within said bore diameter.

6. A method for securing an anchor bolt as recited in claim 5, wherein said enlarged portion is formed by adding a separate sleeve to said anchor bolt.

7. A method for securing an anchor bolt as recited in claim 1, further comprising a cap retainer for locating said cap with respect to said tube.

8. A method for securing an anchor bolt as recited in claim 7, wherein said cap retainer is formed integrally with said tube.

9. A method for securing an anchor bolt as recited in claim 1, further comprising a mechanical interface feature configured to align said cap with said tube.

10. A method for securing an anchor bolt as recited in claim 1, wherein:

a. said inner flange of said tube extends well outward from said tube; and b. said outer flange of said tube extends well outward from said tube.

11. A method for securing an anchor bolt in a concrete structure, said concrete structure being created by pouring liquid concrete into a form and allowing said concrete to harden, said form having an inward facing side, an outward facing side, and at least one form hole passing therebetween, comprising:

a. providing a bolt retainer having a first side, a second side, and a passage therebetween;

b. said passage having a retaining feature;

c. providing an anchor bolt having a threaded portion, with said threaded portion being sized to engage said retaining feature in said passage through said bolt retainer;

d. said retaining feature being configured to allow said anchor bolt to be driven through said passage in a direction from said second side of said bolt retainer toward said first side of said bolt retainer, but not pulled back in the opposite direction;

e. providing a tube having a bore, a first end, and a second end;

f. providing a cap having an open end and a closed end, said cap including a hole passing through said closed end;

g. providing an installation bolt having a head and a threaded portion configured to pass through said hole in said cap;

h. placing said second side of said bolt retainer against said first side of said tube;

i. placing said open end of said cap against said first side of said bolt retainer, so that a cavity is formed on said second side of said bolt retainer;

j. placing said outer flange of said tube against said inward facing side of said form in a position whereby said bore of said tube aligns with said form hole;

k. passing said installation bolt through said form hole while leaving said head of said installation bolt outside of said outward facing side of said form;

l. passing said threaded portion of said installation bolt through said bore, through said passage in said bolt retainer and through said hole in said cap;

m. attaching said installation bolt to said cap, so that said cap, said bolt retainer, and said tube are drawn together and drawn against said inward facing side of said form;

n. pouring said liquid concrete into said form and allowing said concrete to harden;

o. removing said installation bolt;

p. removing said form; and q. driving said anchor bolt through said bore and through said passage in said bolt retainer, thereby securing said anchor bolt to said concrete structure.

12. A method for securing an anchor bolt as recited in claim 11, wherein:

a. said passage passing from said first side to said second side of said bolt retainer is bounded by an angled perimeter which protrudes outward from said second side; and b. said angled perimeter includes a retaining edge configured to engage said threaded portion of said anchor bolt.

13. A method for securing an anchor bolt as recited in claim 12, said angled perimeter containing a plurality of radial slots.

14. A method for securing an anchor bolt as recited in claim 11, wherein said retaining edge has a diameter, and wherein said threaded portion of said installation bolt is smaller than said diameter of said retaining edge, so that said threaded portion of said installation bolt can pass through said retaining edge without engaging said retaining edge.

15. A method for securing an anchor bolt as recited in claim 14, wherein:

a. said bore in said tube has a bore diameter which is larger than said diameter of said retaining edge; and b. said installation bolt has an enlarged portion which is a close sliding fit within said bore diameter.

16. A method for securing an anchor bolt as recited in claim 15, wherein said enlarged portion is formed by adding a separate sleeve to said anchor bolt.

17. A method for securing an anchor bolt as recited in claim 11, further comprising a cap retainer for locating said cap with respect to said tube.

18. A method for securing an anchor bolt as recited in claim 17, wherein said cap retainer is formed integrally with said tube.

19. A method for securing an anchor bolt as recited in claim 11, further comprising a mechanical interface feature configured to align said cap with said tube.

20. A method for securing an anchor bolt as recited in claim 11, wherein:
   a. said inner flange of said tube extends well outward from said tube; and
   b. said outer flange of said tube extends well outward from said tube.

* * * * *